(12) United States Patent
Lewis (10) Patent No.: US 9,139,347 B2
(45) Date of Patent: Sep. 22, 2015

(54) RECLOSABLE BEAM BLADE WIPER BLADE PACKAGE

(75) Inventor: Gregg S. Lewis, Middleton, WI (US)

(73) Assignee: Portage Plastics Corporation, Portage, WI (US)

( * ) Notice: Subject to any disclaimer, the term of this patent is extended or adjusted under 35 U.S.C. 154(b) by 1105 days.

(21) Appl. No.: 13/320,398

(22) PCT Filed: Sep. 16, 2009

(86) PCT No.: PCT/US2009/057223
§ 371 (c)(1),
(2), (4) Date: Nov. 14, 2011

(87) PCT Pub. No.: WO2010/033646
PCT Pub. Date: Mar. 25, 2010

(65) Prior Publication Data
US 2012/0111858 A1  May 10, 2012

Related U.S. Application Data

(60) Provisional application No. 61/097,502, filed on Sep. 16, 2008.

(51) Int. Cl.
| B65D 69/00 | (2006.01) |
| B65D 77/26 | (2006.01) |
| B65D 43/16 | (2006.01) |
| B60S 1/38 | (2006.01) |

(52) U.S. Cl.
CPC .............. *B65D 77/26* (2013.01); *B65D 43/162* (2013.01); *B60S 2001/3843* (2013.01); *B60S 2001/3898* (2013.01); *B65D 2585/6885* (2013.01)

(58) Field of Classification Search
CPC .................... B65D 43/162; B65D 2585/6885; B65D 2251/105; B60S 2001/3898
USPC .......................................... 206/470, 335, 448
See application file for complete search history.

(56) References Cited

U.S. PATENT DOCUMENTS

| 5,899,334 A | 5/1999 | Domerchie et al. |
| 6,070,723 A | 6/2000 | Lewis |
| 6,168,020 B1 | 1/2001 | Niedzwiedz |

(Continued)

FOREIGN PATENT DOCUMENTS

| JP | 03-140355 U9 | 3/2008 |
| KR | 10-0503326 B1 | 7/2005 |

(Continued)

*Primary Examiner* — Anthony Stashick
*Assistant Examiner* — Ernesto Grano
(74) *Attorney, Agent, or Firm* — Boyle Fredrickson S.C.

(57) ABSTRACT

An elongate article holding package for a pre-curved beam blade wiper blade includes a pair of packaging panels joined by a living hinge. In a currently preferred embodiment, the package has two panels joined by a living hinge. A first panel is configured to retain the wiper blade in a substantially straight configuration within a cavity formed in the panel, and the second panel is pivotally connected by the living hinge to be disposed in either a closed or an open position with the first panel. The first panel preferably includes a first channel having a first bottom wall and a second channel disposed in the first bottom wall and in communication with the first channel. The first panel preferably also includes retention fingers to positively retain the wiper blade and recessed sidewall portions to facilitate insertion and extraction of the wiper blade into the first panel.

33 Claims, 6 Drawing Sheets

(56) References Cited

U.S. PATENT DOCUMENTS

| | | |
|---|---|---|
| 6,766,906 B2 | 7/2004 | Charng |
| 6,779,661 B1 * | 8/2004 | Kotlarski ................. 206/349 |
| 7,527,151 B2 | 5/2009 | Park |
| 7,699,169 B2 | 4/2010 | Lewis |
| 7,841,470 B2 | 11/2010 | Chin |
| 8,042,690 B2 | 10/2011 | Lewis |
| 2003/0062284 A1 | 4/2003 | Charng |
| 2005/0252812 A1 | 11/2005 | Lewis |
| 2006/0081493 A1 | 4/2006 | Park |
| 2007/0017842 A1 | 1/2007 | Clamagirand et al. |
| 2007/0235362 A1 | 10/2007 | Lewis |
| 2007/0272577 A1 * | 11/2007 | Kim ........................ 206/470 |
| 2008/0230404 A1 * | 9/2008 | Park ...................... 206/45.23 |

FOREIGN PATENT DOCUMENTS

| | | |
|---|---|---|
| KR | 10-0592339 B1 | 6/2006 |
| KR | 10-0764468 B1 | 10/2007 |
| KR | 10-0802026 B1 | 2/2008 |

* cited by examiner

RECLOSABLE BEAM BLADE WIPER BLADE PACKAGE

CROSS-REFERENCE TO RELATED APPLICATION

This application claims all benefits from and priority to, under 35 U.S.C. Section 119(e), U.S. Provisional Application Ser. No. 61/097,502, filed Sep. 16, 2008, the entirety of which is hereby expressly incorporated herein by reference.

FIELD OF THE INVENTION

The present invention relates to a reclosable package for holding a pre-curved beam blade wiper blade.

BACKGROUND OF THE INVENTION

Beam-type windshield or windscreen wiper blades are growing in popularity throughout the United States and the world. Beam-type wiper blades have an elongate beam "backbone" that is curved along its length. The beam is typically made of a relatively thin strip of metal that has been formed in a manner to impart a curve in it to "pre-curve" an elastomeric wiping element attached to one side of the beam. An outer housing, which can be or include an airfoil, is located on the other side of the beam and can cover the beam. Typically, there is an adapter or mount attached to the beam in the middle that is used for releasably mounting the wiper blade to a vehicle, attached to the beam. Examples of beam-type wiper blades are disclosed in U.S. Pat. Nos. 6,836,925, 6,813,923, and 6,550,096.

The curved beam helps ensure more constant and even pressure is applied by an outer tip or edge of the wiping element along the entire windshield, providing a smoother, more consistent wipe. The curved beam "pre-curves" the wiping element so it better conforms to the windshield or windscreen, which typically is also curved. "Pre-curving" the wiping element so it better conforms to the curvature of the windshield or windscreen produces a more consistent wipe because a beam-type wiper blade has, in theory, an infinite number of contact points with the windshield or windscreen. This contrasts with conventional wiper blades that use a rather bulky, complicated and expensive articulating framework to support the wiping element, producing somewhere around six or eight pressure points with the windshield or wind screen.

In use, a beam-type wiper blade is attached by its mount or adapter to a wiper arm of a vehicle. In operation, each wiper arm and attached wiper blade reciprocates back and forth across the windshield or windscreen when a driver actuates the wipers from within the vehicle. The tip or edge of each wiping element rides in concert with the arm along the surface of the windshield or windscreen, essentially functioning as a squeegee to urge water in its path off the windshield or windscreen.

Packaging such a beam-type windshield wiper blade poses unique challenges as compared to conventional wiper blades because of its curved beam "pre-curving" the wiping element. One challenge relates to the fact that beam-type wiper blades are significantly wider when laid on their sides than conventional wiper blades. For example, where a conventional blade typically has a maximum transverse width no greater than three inches, a beam-type blade has a greater maximum transverse width that can be as wide as four or five inches because of the curve of the beam.

Another challenge relates to protecting the wiping element when packaged. Due to the curvature of the beam and the fragile nature of the wiping element, the wiping element can become warped or distorted over time if the blade is not properly supported. This warpage and distortion can result in poor or uneven contact with the windshield, which can cause undesirable streaking during wiper operation. Should this warpage or distortion extend along any part of the squeegee edge or tip of the wiping element, it can make these problems even worse. If too great, it can undesirably result in such warped or distorted wiper blades being returned to the store for refund.

Accordingly, it would be desirable and advantageous to provide packaging for a beam-type wiper blade that protects the blade while minimizing the volume it occupies.

SUMMARY OF THE INVENTION

The present invention is directed to a package for an elongate article that preferably is a wiper blade of pre-curved beam construction. In a currently preferred embodiment, the package has two panels joined by a living hinge. At least one panel is configured to retain the wiper blade in a substantially straight configuration within a cavity formed in the panel. The cavity includes a first channel having a first bottom wall and a second channel disposed in the first bottom wall and in communication with the first channel. The second panel is pivotally connected by the living hinge to enclose the cavity when disposed in a closed position and in engagement with the first panel. Optionally, the second panel may engage the wiper blade to positively retain the wiper blade in the cavity of the first panel.

The channel-in-channel configuration supports the wiper blade within the first panel while preventing the tip or edge of a wiping element from contacting the panel so as to protect it by preventing warping or otherwise deforming the wiping element. A flange on the wiper blade extending outward beyond either side of the wiping element engages the first bottom wall on both sides of the second channel. The wiping element extends into the second channel, and the depth of the second channel is greater than the depth of the wiping element. The wiper blade is preferably inserted into the cavity of the first panel such that the wiper blade is in a substantially straightened configuration with the flange engaging the first bottom wall.

The first panel preferably also includes retention fingers to engage the wiper blade and releasably retain the wiper blade in the substantially straightened configuration. Preferably, at least one retention finger extends outward from each wall of the first channel and overlies a part of the first bottom wall. The retention fingers may have a curved surface disposed toward the first bottom wall that engages a complimentarily curved portion of the wiper blade and retains the wiper blade in a substantially straightened configuration. The retention fingers may further include an inclined upper surface to facilitate insertion of the wiper blade into the cavity. Preferably, the retention fingers extend from the side walls generally adjacent to a top wall of the cavity.

To further facilitate insertion and extraction each of the side walls of the first channel preferably include a recessed wall portion disposed below each of the retention fingers. The recessed wall portions facilitate deflection of the retention fingers as the wiper blade is inserted to or extracted from the first panel.

The first panel preferably also includes at least one member to restrict movement of the wiper blade within the cavity thereby minimizing damage to the wiper blade during shipping. A support rib may extend from a sidewall of and into the first channel to engage a side surface of the wiper blade and positively retain the wiper blade transversely in the cavity. The first panel may also include an adapter seat which forms a recess in the bottom panel and includes a first and a second end wall disposed on longitudinally opposite sides of the recess to positively retain the wiper blade longitudinally in the cavity.

The package is preferably reclosable via a latching arrangement that positively retains the second panel in a closed position and in engagement with the first panel. Preferably, one panel includes a raised rib extending around a portion of the outer periphery of the panel. The other panel includes a channel extending around a complimentary portion of the outer periphery of the other panel. The rib engages the channel to positively retain the two panels in a closed position.

Objects, features and advantages of the present invention include providing a wiper blade package that is aesthetically attractive; that is of economical manufacture, that is durable, that is lightweight and low cost to ship, that is strong, that is easy to make and use, that is more versatile and adaptable, and which is durable, robust and reliable.

Numerous other aspects, features and advantages of the present invention will be made apparent from the following detailed description taken together with the drawing figures.

DRAWING DESCRIPTION

The drawings illustrate the best mode currently contemplated as practicing the present invention. One or more preferred exemplary embodiments of the invention are illustrated in the accompanying drawings in which like reference numerals represent like parts throughout and in which.

Before explaining each embodiment of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
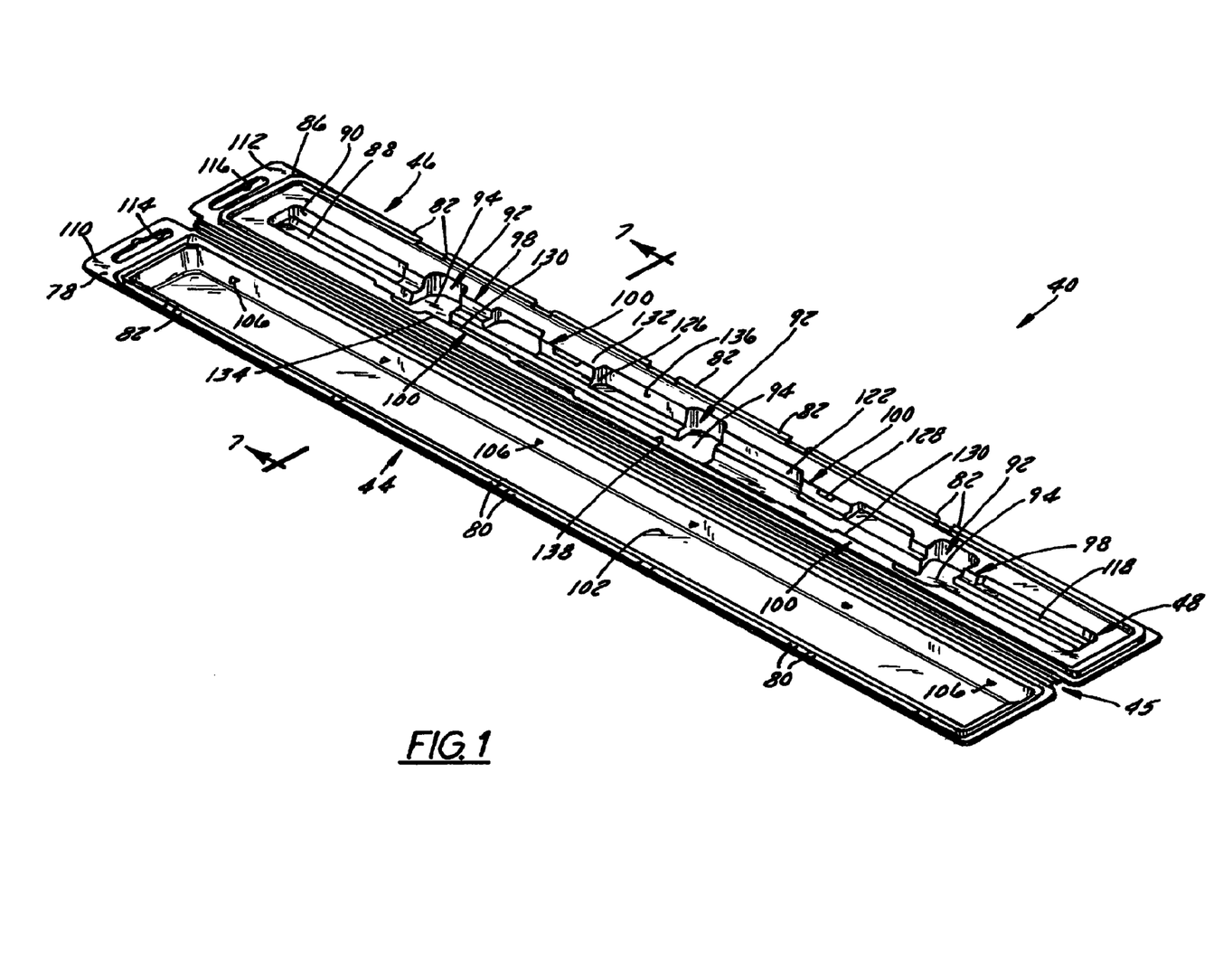
FIG. 1 is a top perspective view of one embodiment of the reclosable beam blade wiper blade package in a fully open condition.
Figure 2:
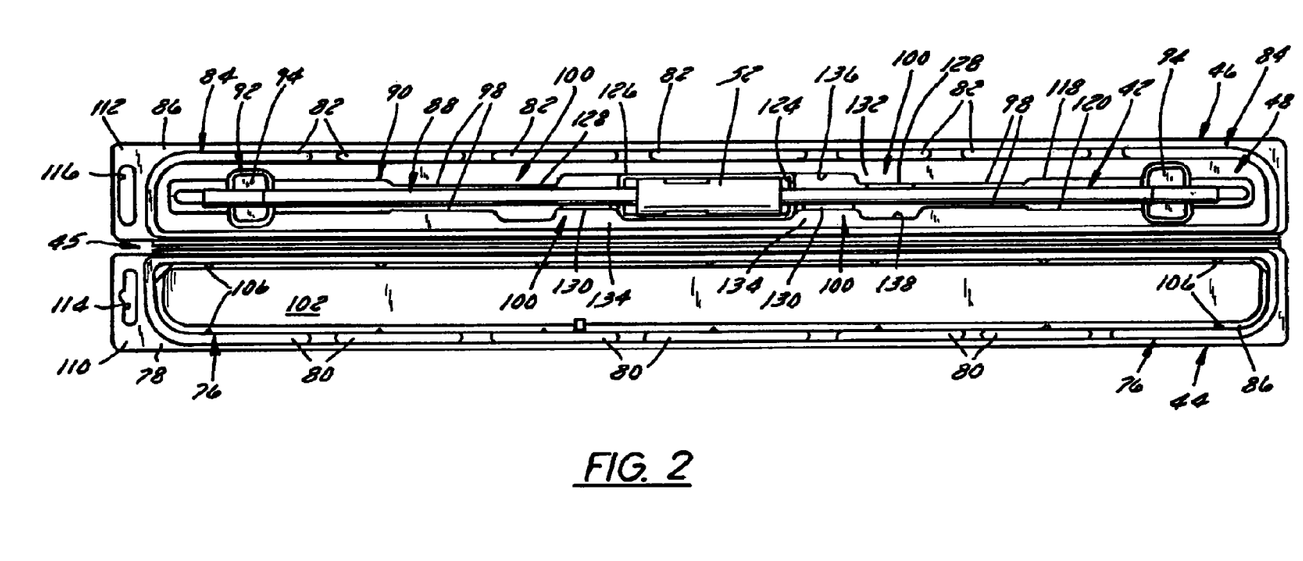
FIG. 2 is a top plan view of another embodiment of the reclosable beam blade wiper blade package with a beam blade wiper blade seated therein.

FIGS. 1-2 illustrate a reclosable beam blade wiper blade package 40 for a wiper blade 42 that is an elongate beam type wiper blade that is pre-curved in a manner that provides a more uniform contact force over the length of the blade 42 with a vehicle windshield or windscreen. The package 40 has a top panel 44 that serves as a cover joined by a living hinge 45 to a bottom panel 46 that serves as a beam blade-holding base that includes a three-dimensionally contoured cavity 48 formed in it that is configured to releasably retain the beam blade 42 therein in a substantially straightened condition without coming into contact with at least an outer wiping tip 64 of a flexible and pivotable hinged wiping element 50.

Figures 3, 4:
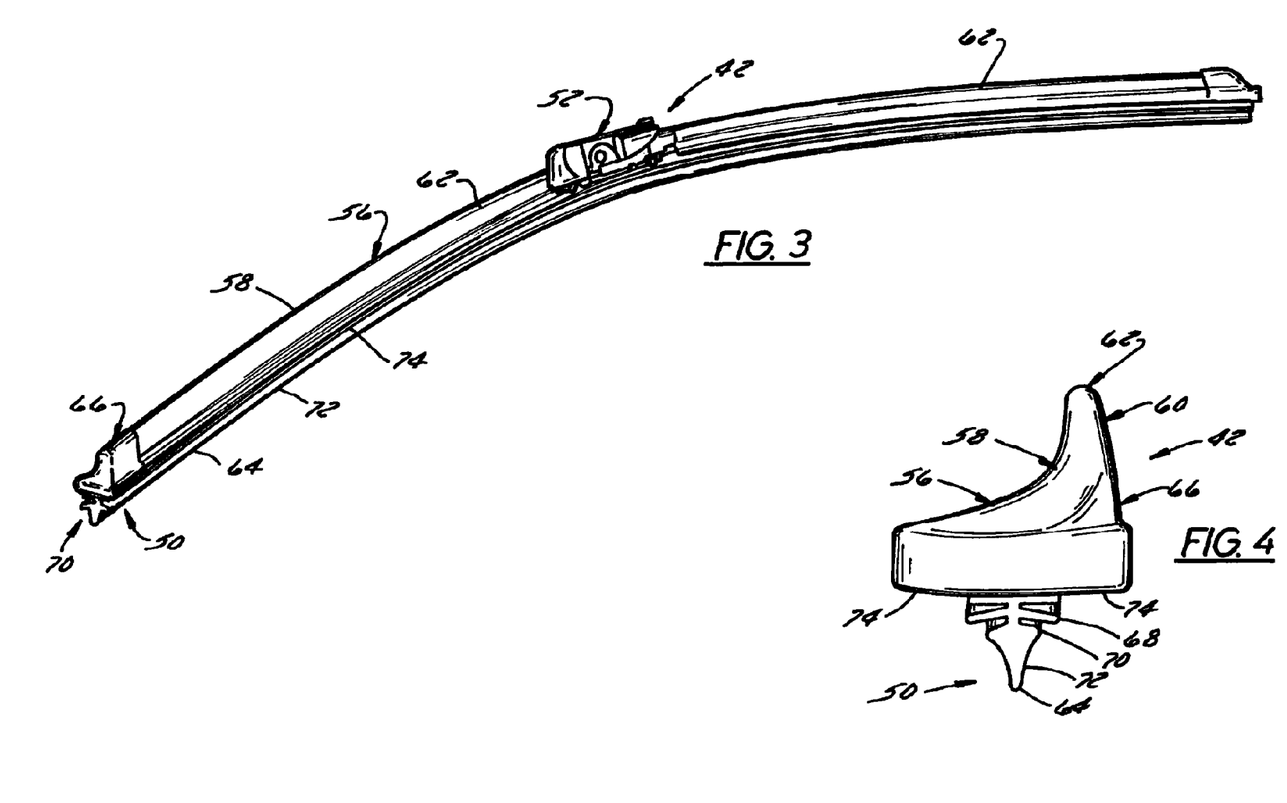
FIG. 3 is a side elevation view of a beam type wiper blade equipped with an airfoil carried by its pre-curved beam.
FIG. 4 is an end view of the beam type wiper blade disposed in a vertical or operating orientation.

FIGS. 3-4 illustrate a preferred embodiment of a beam type wiper blade 42 that is of elongate and pre-curved construction such that it has a radius of curvature when simply laid on its side in a relaxed condition like that shown in FIG. 3. The beam blade 42 has a generally centrally located adapter 52 that is configured to be releasably engage to a reciprocating wiper blade arm (not shown) of a motor vehicle. The adapter 52 is anchored to an elongate beam 54, shown in FIG. 4, which is of generally rectangular cross-section, which extends substantially the full length of the beam blade 42, and which typically is constructed of a metal, such as steel, that is formed in a manner that imparts a curve to it. The beam 54 serves as a spine or frame for the beam blade 42 and is the location from which the wiping element 50 outwardly extends with its curve imparting a "pre-curve" to the wiping element 50.

Overlying and encasing the beam 54 of the blade 42 is an outer housing or covering 56, which can be a contoured airfoil, formed of a pair of surfaces 58, 60 that interconnect at a vertex 62 defining an airfoil having an upside down V-shaped cross-sectional configuration. In the beam blade shown in the drawing figures, the vertex or apex 62 can be offset from the middle toward one side edge of the beam 54. Where the outer covering 56 is an airfoil, each airfoil surface 58, 60 has an outer surface of generally curvilinear, concave construction with one of the airfoil surfaces 58, 60 deflecting air flowing over a moving vehicle during operation in a manner that causes the air to exert a downforce thereon that helps keep the tip 64 of the wiping element 50 in contact with the windshield or windscreen of the vehicle. Each panel 58, 60 has an inturned flange 74 having at least a portion overlapping part of the underside of the beam 54. In a preferred embodiment, each inturned flange 74 has a channel (not shown) formed in it that receives a portion of a corresponding outer edge of beam 54. In a preferred embodiment, the airfoil 56 is an elongate sleeve of one-piece, unitary and substantially homogenous construction that is made of plastic of the like that telescopically slips over at least part of the beam 54 with each outer edge of the beam received in a corresponding channel formed in inturned flange 74. There is a similarly shaped cap 66 located at each end of the beam blade 42 that can also serve as an airfoil as well as a means for helping to keep airfoil 56 on the beam 54 of the blade 42.

The wiping element 50 of the beam blade 42 is shown in more detail in FIG. 4. The wiping element 50 is attached by base 68 to the underside of the beam 54. The base 68 is attached to the underside of the beam 54, such as by an adhesive or the like. The wiping element 50 includes a flexible hinge 70 that extends outwardly from the base 68 that enables pivotable movement of the wiping element 50. The wiping element 50 includes a generally triangularly shaped wiping element body 72 with the wiping edge or tip 64 formed of or otherwise disposed along its outer edge. The wiping element 50 is made of a flexible material, such as an elastomeric or polymeric material, like rubber, silicone, or the like.

Figure 5:
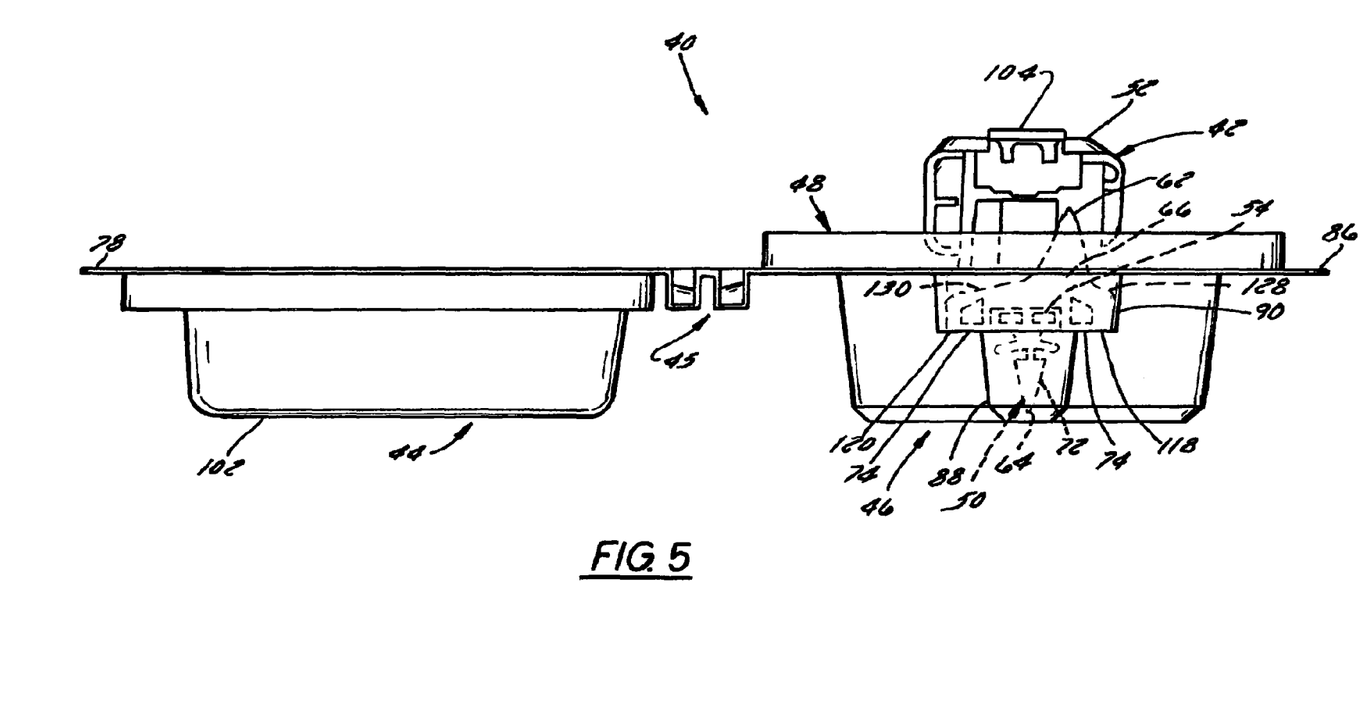
FIG. 5 is an end view of the opened beam blade wiper blade package with a beam blade wiper blade received in a cavity in one panel of the package in a generally vertical orientation.

With reference to FIG. 5, the cover 44 of the beam blade wiper blade package 40 is releasably disengageable from the bottom panel 46 to open the package 40 exposing the beam blade 42 releasably received in cavity 48 formed in the bottom panel 46. The package 40 is of clamshell construction with the hinge 45 attaching the cover 44 to the bottom panel 46 in a manner that enables the cover 44 to be closed, opened and reclosed several times thereby enabling a returned package to be put back on retail display in a retail store in a condition that would appear to a prospective purchase that it had never been previously opened.

Figure 6:
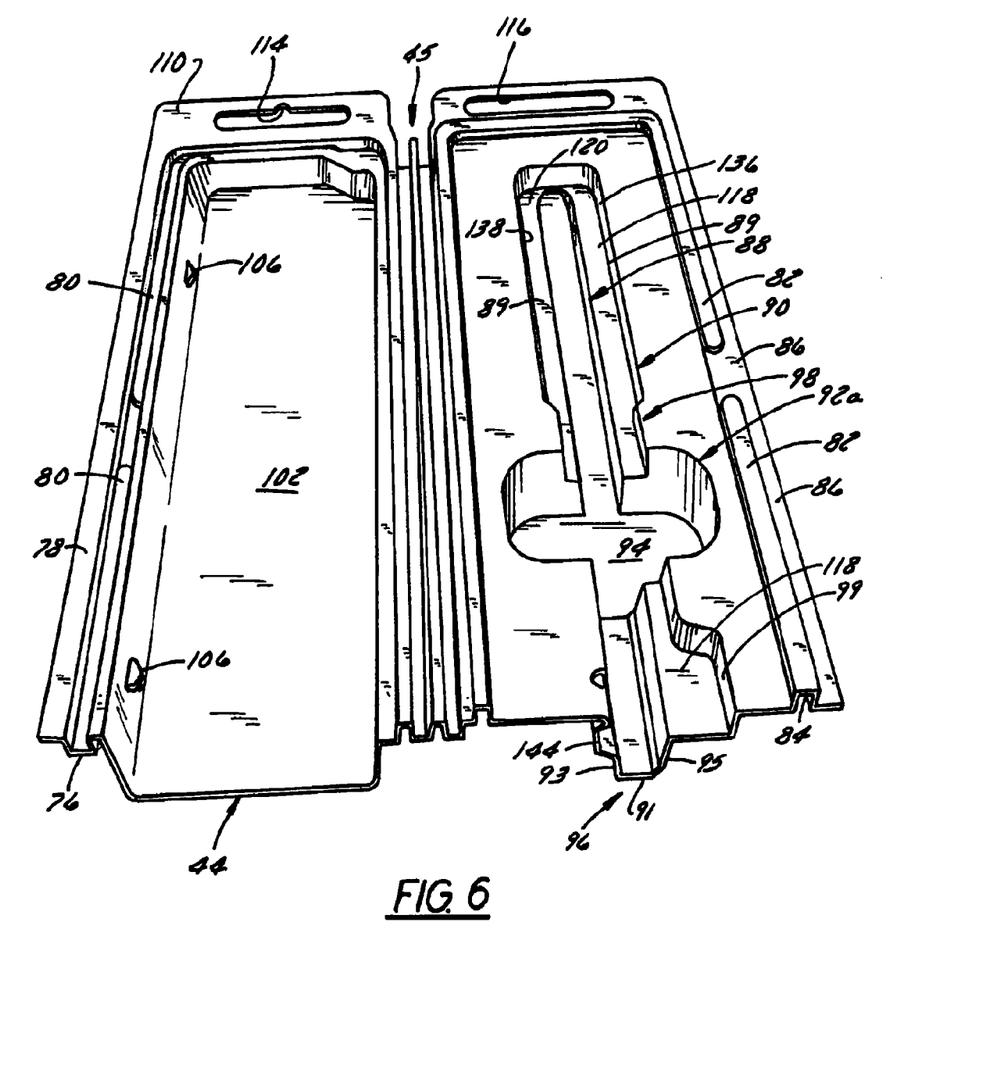
FIG. 6 is a fragmentary top perspective view of a portion of the opened beam blade wiper blade package.

Referring additionally to FIG. 6, to enable the beam blade wiper blade package 40 to be of reclosable construction, the cover 44 can be include a channel 76, formed by an inverted rib or channel, inboard of an outer flange 78 that can extend about at least portion of the outer periphery of the cover 44. The channel 76 can be formed with a plurality of elongate pockets 80 formed therein that each can engage a corresponding upraised boss 82 or the like that can be formed in an upraised rib 84 inboard of an outer flange 86 that can extend at least about a corresponding portion of the outer periphery of the bottom panel 46.

Such an arrangement can be used to enable the cover 44 to be releasably engaged with the wiper blade holding bottom panel 46 when the cover 44 is suitable folded about hinge 45 over and into engagement with panel 46 producing a reclosable package. If desired, a thin layer of an adhesive (not shown) can be applied between the channel 76 and rib 84 to help keep the cover 44 closed during shipment or transit. If desired, another type of reclosable closure arrangement can be used. Examples of such closure arrangements that would enable a wiper blade package 40 constructed in accordance with the present invention to be reclosable include a snap fit arrangement, such as a snap hinge closure, annular snap fit arrangement, a bar snap arrangement, a boss snap arrangement, a zipper arrangement, or the like.

With additional reference to FIGS. 1, 2, and 4-7, cavity 48 is three dimensionally contoured and configured to releasably receive and retain beam blade 42 in a substantially straightened condition even when the cover 44 is open. Cavity 48 can be configured to have a length that is substantially the same length as that of a beam blade 42, but can be longer so as to be able to accommodate one of a plurality of beam blades 42 of different lengths. The cavity 48 includes a relatively narrow wiping element receiving channel 88 that extends substantially the length of the beam blade holding cavity 48, which is configured to provide sufficient clearance to accommodate receipt of the beam blade wiping element 50. Overlying and disposed in communication with wiping element receiving channel 88 is a wider elongate beam blade body receiving channel 90 that also extends substantially the length of the cavity 48.

Referring again to FIGS. 1-2, each of these beam blade component receiving channels 88, 90 are integrally formed in the bottom panel 46 of the beam blade package 40. As is shown in FIGS. 1 and 2, the longitudinal centerline of the wiping element receiving channel 88 can be substantially aligned with the longitudinal centerline of the wider beam blade body receiving channel 90 defining support ledges 118, 120 extending on either side of channel 88 that also serve as a portion of the bottom wall 89 of channel 90. When the beam blade 42 is inserted into cavity 48 a portion of the bottom of flange 74 of the airfoil sleeve 56 that runs along the bottom of the beam 54 on either side of the wiping element 50 rests on a corresponding one of the support ledges 118, 120 with the wiping element 50 received in channel 88.

Each of these channels 88, 90 communicate with at least a plurality of generally oblong or rectangular recesses 92 that can interrupt one or both channels 88, 90. The bottom wall 94 of each such recess 92 can function as a base or foot 96 that can rest on a flat surface when the beam blade package 40 is placed thereon. The bottom wall 94 of each recess 92 may be generally coplanar with the bottom wall 91 of the channel 88, providing a large bottom surface to support the package 40 when placed on a flat surface. In the embodiment shown in FIG. 1, there are three substantially equally spaced apart recesses 92 that provide relatively large bottom wall surface area that enables package 40 when holding a beam blade 42 to rest more stably on these feet 96 formed by the pocket bottom walls 94. If desired, the package 40 may include two recesses 92 with one positioned at each end of the package 40, as shown in FIG. 2. Still other embodiments may utilize a single recess 92 centrally located or any other number of recesses 92 positioned longitudinally along the package 40 such that the bottom wall 94 of each recess 92 cooperates with the other bottom walls 94 to provide a surface to stably support the package 40. The recesses 92 may be generally transverse to the channels 88, 90 and extend substantially along a width of the bottom surface. In addition, each recess 92 advantageously also can function as an access pocket that helps enable a finger or a plurality of fingers, such as that of an assembler, robot or the like (not shown), to have sufficient clearance from the outer sidewalls defining channels 88, 90 when inserting a beam blade 42 into the cavity 48 during packaging of the blade 42. Such an access pocket recess 92 can also advantageously enable a purchaser or installer to be able to easily use a finger or fingers to grasp and remove a beam blade 42 from the cavity 48.

There may be a one or more necked down sections 98 of the beam blade body receiving channel 90 that helps locate the beam blade 42 by generally centering the blade 42 during insertion or packaging so that its wiping element 50 is received within the wiping element receiving channel 88. If desired, each one of the necked down sections 98 can be or include a support rib that can be elongate and that extends inwardly into the channel 90 adjacent or alongside a top or outer edge 99 of the channel 90. Such a necked down section 98 helps locate at least the wiping element tip 64, if not the wiping element 50 itself, so it is properly positioned within channel 88 in a manner that helps ensure at least the fragile tip 64 is protected by the package 40 during shipment, storage, and retail display.

Such a necked down section 98 also helps locate beam blade 42 so that a portion of the beam 54 on either side of the wiping element 50 rests on a corresponding beam support ledge 118, 120. Where the beam 54 is covered or encased by part of covering or housing 56, necked down sections 98 help ensure that a bottom of the covering or housing 56, e.g. bottom of airfoil 56, underlying a corresponding bottom portion of the beam 54 on either side of wiping element 50 rests on corresponding beam support ledge 118, 120.

In a preferred embodiment, each beam support ledge 118, 120 is formed by a corresponding portion of a bottom wall 89 of channel 90 adjacent the edge the wall terminates at channel 88. Wiping element can be supported by one or both sidewalls 93, 95 of channel 88. Bottom wall of channel 90 is spaced sufficiently far away relative to the outward extent of wiping element that it ensures that the tip or edge 64 of the wiping element 50 remains above the bottom wall 91 of channel 88 so as not to come into contact with the bottom wall 91 of channel 88 when the beam blade 42 is seated in cavity 48. Such a necked down section 98 can also help locate the body of the beam blade 42 as it is being inserted into the beam blade cavity 48 in a manner that helps ensure positive engagement of the blade 42 with one or more beam blade retainer arrangements 100. In addition, after insertion, such a necked down section 98 cooperates with one or more beam blade retainer arrangements 100 by helping maintain the position the beam 54 and/or covering or housing 56, e.g., airfoil, within channel 90 helping maintain positive engagement with beam blade retainer arrangements 100 by preventing the force the beam blade 42 due to its "pre-curved" beam 54 acting against the bottom panel 46 from popping the blade 42 out of cavity 48.

In one embodiment, there is at least one necked down section 98 adjacent at least one of the beam blade retainer arrangements 100. In a preferred embodiment, there is at least one necked down section 98 adjacent at least one of the beam blade retainer arrangements 100 on each side of channel 90. In addition, there can be opposing necked down sections 98 on one side or both sides of each outermost recess 92 such as is shown in FIGS. 1 and 2.

One of the recesses 92 is generally centrally located between opposite ends of the cavity 48 and can be disposed in a widened section of channel 90 that includes a recessed adapter seat 122 in which the beam blade adapter 52 is received when the beam blade 42 is seated in the cavity 48 after insertion. The end walls 124, 126 of the adapter seat 122 can help longitudinally center the blade 42 in the cavity 48. The adapter seat 122 is shown in FIG. 10 as being generally rectangular but can be complementarily configured for an adapter having a different shape or configuration.

Each beam blade retainer arrangement 100 is disposed along a portion of the beam blade cavity 48 between central recess 92 and an outer recess 92 so as to uniformly engage beam blade 42 when the blade 42 is inserted into the cavity 48. Each beam blade retainer arrangement 100 includes a pair of spaced apart, opposed, staggered and resilient beam blade retention fingers 128, 130 integrally formed in a portion of the bottom panel 46 so as to extend outwardly into a portion of the beam blade body receiving channel 90 to engage a portion of the airfoil 56 of the blade 42 during and after blade insertion. Each finger 128, 130 cooperates with the other finger 130, 128 of the retainer arrangement to define a snap-fit with the airfoil 56 of the beam blade 42 enabling the blade 42 to be snapped into the beam blade cavity 48 and retained by the fingers 128, 130 of each retainer arrangement 100 in the cavity 48 in a substantially straightened condition even while the cover 44 is open. Each finger 128, 130 extends inwardly into channel 90 from a respective abutment 132, 134 that extends inwardly from a corresponding sidewall 136, 138 of channel 90 to help locate the beam blade 42 in the channel 90 relative to the fingers 128, 130 during insertion and to ensure that each finger 128, 130 of each retainer arrangement 100 remains in positive retaining engagement with a portion of the airfoil 56, such as part of one of its outer surfaces 58, 60.

Figure 7:
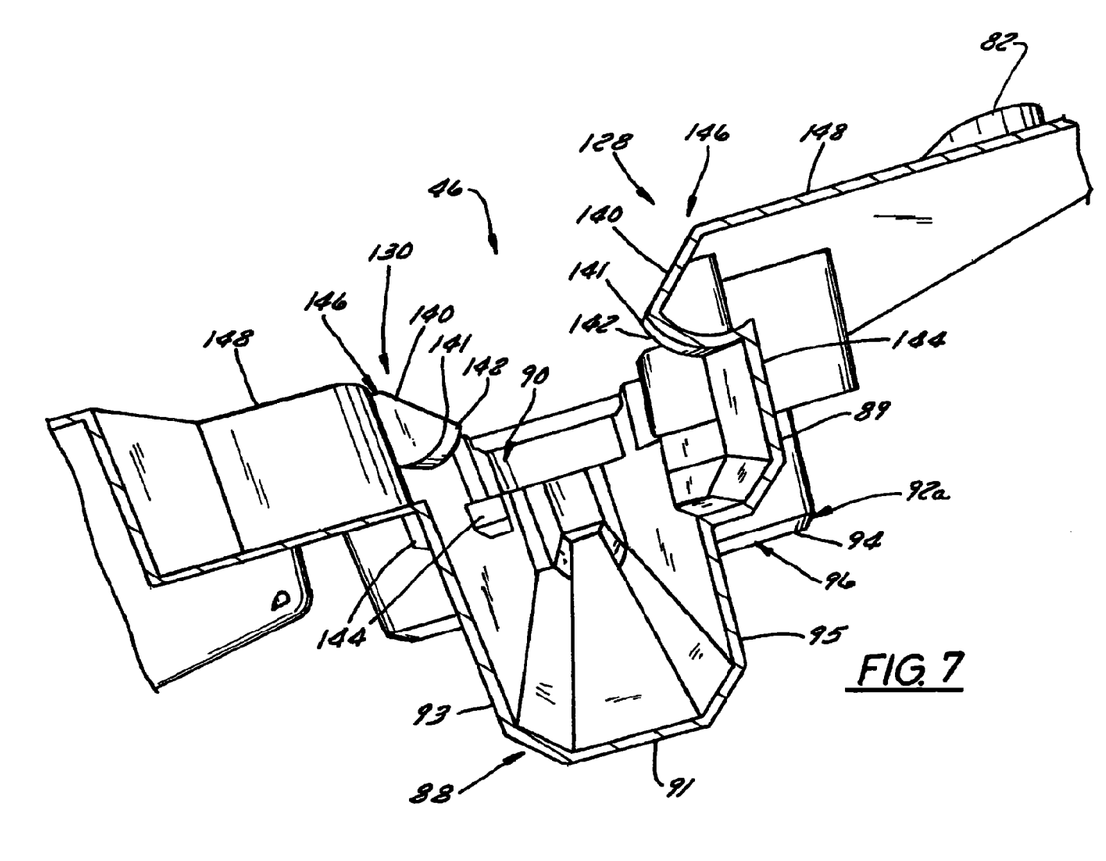
FIGS. 7 are perspective transverse cross sectional views of the beam blade wiper blade package taken at 7-7 in FIG. 1.

As is best shown in FIG. 7, each finger 128, 130 has a canted or inclined leading edge 140 that facilitates entry of the beam blade 42 into cavity 48 and a curved or chamfered bottom beam blade retention surface 142 that can be complementarily curved or chamfered to provide better contact with the curved concave surface of a corresponding airfoil surface 58 or 60 of airfoil 56. This can be done through optimizing the surface area of engagement between curved bottom finger surface 142 and a corresponding outer housing or airfoil surface 58, 60. As result, retention force of engagement between each finger 128, 130 is maximized thereby helping the fingers 128, 130 to positively retain beam blade 42 in beam blade cavity 48 in a substantially straightened condition, even without the cover 44 being closed, despite the force being applied against the bottom panel by the "pre-curved" beam of the blade 42 tending to want to pop it out.

Where the package 40 is made by thermoforming a sheet of thermoformable material, configuring fingers 128, 130 each with such a chamfered bottom surface 142 enables a finger that extends further outwardly into cavity 48 to be integrally formed. This is because the portion of the mold used to form each finger 128, 130 is formed with such a complementarily chamfered surface and is pivotally connected to the mold in a manner that allows it to pivot upwardly during de-molding of a finished molded package 40.

In a preferred embodiment, the length that each opposed pair of fingers 128, 130 extend into cavity 48 produces an interference fit with a beam blade 42 inserted into the cavity 48. Preferably, the interference fit produced is a snap fit. In such a preferred embodiment, each opposed pair of fingers 128, 130 extends into cavity 48 far enough where the gap between the innermost edge 141 of opposed fingers 128, 130 is less than the width of the beam 54 of blade 42. Such an innermost edge 141 for the fingers 128, 130 shown in the drawing figures is where finger surfaces 140, 142 converge. In one preferred embodiment, each finger 128, 130 extends inwardly into cavity 48 far enough so as to overlie an adjacent part of beam 52 extending beyond wiping element but not so far as to overlie the wiping element. A package 40 constructed in accordance with the present invention has an opposed pair of fingers 128, 130 of at least one retainer arrangement 100 on one side of adapter seat 122 and an opposed pair of fingers 128, 130 of at least one retainer arrangement 100 on the other side of adapter seat 122 has a spacing or gap between their innermost edges that produces positive engagement with a beam blade 42 received in cavity 48 that prevents the blade 42 from popping out even with the cover 44 open.

Below each finger 128, 130 there can be and preferably is a recessed sidewall portion 144 that can facilitate insertion by enabling each finger 128, 130 during beam blade insertion to deflect at least slightly inwardly, such as by enabling the finger to at least slightly pivot at or about its upper region of attachment 146 to a top surface 148 of bottom panel 46. Where package 40 is made by thermoforming, such a recessed sidewall portion 144 helps enable finger 128 or 130 extending outwardly above to extend sufficiently far into cavity 48 for the thin cross sectional thickness or thin gauge material contemplated. During insertion, the bottom of the beam blade 42, e.g., inturned flanges 74 of airfoil surfaces 58, 60 of airfoil 56 bear against an inclined leading edge surface 140 of a respective retainer finger 128, 130 causing each finger 128, 130 to deflect inwardly and/or rotate slightly away from the blade 42 permitting passage of its body into channel 90. After the airfoil 56 passes below the inclined leading edge surface of each finger 128, 130, the finger 128, 130 snaps back into its original position shown in FIG. 7 causing the curved bottom surface 142 of each finger 128, 130 to bear against a portion of respective airfoil surface 58, 60 positively retaining the beam blade 42 in cavity 48. Recessed sidewall portion 144 can also provide reinforcement.

The cover 44 includes an outer generally upraised planar outer wall 102 that defines part of a beam blade enclosure when the cover 44 is closed that is sufficiently upraised so as to at least overlie the adapter 52 of a beam blade 42 seated in beam blade receiving cavity 48 in the bottom panel 46. In a preferred embodiment, a portion of the outer cover wall 102 is disposed very close to an uppermost or outermost part 104 of the adapter 52 of beam blade 42 when the beam blade 42 is seated in cavity 48 and the cover 44 is closed to help retain the beam blade 42 in cavity 48. In a preferred embodiment, a portion of the outer cover wall 102 abuts or bears against an uppermost/outermost part 104 of the adapter 52 of the beam blade 42 when seated in cavity 48 and the cover 44 is closed helping to further keep the blade 42 seated in the cavity 48.

The cover 44 can be configured with a plurality of spaced apart and interiorly disposed shelves or ledges 106 along at least each side that are spaced from an interior surface of the outer cover wall 102 to help retain a card 108 having printed indicia on it relating to the wiper blade 42. These shelves or ledges 106 are integrally formed with the rest of the package 40.

In addition, both the cover 44 and the bottom panel 46 can include an outwardly extending top portion 110, 112 of corresponding flanges 78, 86 in which an elongate hanger cutout 114, 116 (FIG. 6) can be formed for receiving a hook, hanger, peg or the like of a display case (not shown). A dimple can also be formed in at least one of the flanges 78, 86, such as at or adjacent an upper corner of the flange, which helps a purchaser to separate the flanges 78, 86 to facilitate opening of the package 40.

A beam blade package 40 constructed in accordance with the present invention preferably is molded or otherwise formed, such as by thermoforming or the like, from a sheet of transparent or substantially transparent plastic such that the resultant package 40 formed is of one-piece, unitary and substantially homogeneous construction. Suitable materials include PET, PVC, Styrene or Styrene-Butadiene copolymer or the like that is relatively thin, on the order of about 0.005-0.020 inch thickness, preferably about 0.010 inch, and thermoformed or formed using another suitable thermally vacuum formed molding process.

Various alternatives are contemplated as being within the scope of the following claims particularly pointing out and distinctly claiming the subject matter regarded as the invention. Thus, it is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A reclosable packaging case for a wiper blade comprising:
   a bottom panel having a wiper blade receiving cavity formed therein that is comprised of a pair of spaced apart elongate sidewalls and an elongate bottom defining an elongate cavity having at least one wiper blade retention finger extending from one sidewall into the cavity, the at least one wiper blade retention finger having a wiper blade entry facilitating surface facing generally away from the cavity bottom and a wiper blade retention surface facing generally toward the cavity bottom, the wiper blade entry facilitating surface is inclined downwardly from an upper portion of the sidewall into the cavity, the wiper blade retention surface extending from the wiper blade facilitating surface to a lower portion of the sidewall adjacent the cavity bottom, and the wiper blade retention surface is curved outwardly (i) toward the cavity bottom, and (ii) toward a wiper blade that is receivable in the cavity enabling the wiper blade to be releasably retained in the cavity; and
   a top panel comprised of a cover configured to enclose the wiper blade receiving cavity when disposed in a closed position in engagement with the bottom panel; and
   a hinge pivotally connecting the top and bottom panels: and
   wherein the cavity comprises (i) an elongate wiper blade body receiving channel defined by the cavity sidewalls and the cavity bottom, and (ii) an elongate wiper blade wiping element receiving channel formed in the cavity bottom that is narrower than the elongate wiper blade receiving channel, the wiper blade wiping element receiving channel having a wiper blade wiping element channel bottom; and
   wherein the bottom panel further includes at least one recessed area generally transverse to (i) the wiper blade body receiving channel, and (ii) the wiper blade wiping element receiving channel, the at least one recessed area wider than any portion of the wiper blade body receiving channel and having a bottom generally coplanar to the wiper blade wiping element receiving channel bottom.

2. The reclosable packaging case of claim 1 further comprising a plurality of the retention fingers with at least one of the retention fingers extending from one sidewall into the wiper blade receiving cavity overlying one part of the bottom and at least another one of the retention fingers extending from the other side of the sidewall into the cavity overlying another part of the bottom and wherein outwardly curved wiper blade retention surface of each retention finger is convexly curved to engage and substantially conform with a concavely curved airfoil of a wiper blade received in the cavity releasably retaining the wiper blade within the cavity.

3. The reclosable packaging case of claim 2 wherein the wiper blade entry facilitating surface and the wiper blade retention surface of each retention finger intersect forming an edge of the retention finger that is located innermost within the cavity.

4. The reclosable packaging case of claim 2 wherein the cavity comprises an elongate wiper blade body receiving channel defined by the cavity sidewalls and the cavity bottom, and wherein the cavity further comprises an elongate wiper blade wiping element receiving channel formed in the cavity bottom that is narrower than the elongate wiper blade receiving channel and which has a bottom spaced from an outer tip of a wiping element of a wiper blade received in the wiper blade receiving cavity.

5. The reclosable packaging case of claim 2 wherein one of the top and bottom panels are configured to provide a reclosable packaging case closure arrangement formed of a plurality of elongate bar snaps extending about the periphery of the wiper blade receiving cavity with each one of the bar snaps comprised of an elongate boss formed in one of the top and bottom panels that is received in a corresponding elongate pocket formed in the other one of the top and bottom panels.

6. The reclosable packaging case of claim 5 wherein the packaging case has only a single hinge.

7. The reclosable packaging case of claim 2 wherein there is a first pair of the retention fingers on one side of an adapter of a wiper blade received in the wiper blade receiving cavity and there is a second pair of the retention fingers disposed on the other side of the adapter of the wiper blade received in the cavity.

8. The reclosable packaging case of claim 7 wherein one of the retention fingers of each pair of retention fingers extends from one sidewall into the wiper blade receiving cavity and the other one of the retention fingers of each pair of retention fingers extends from the other sidewall into the cavity, and wherein the retention fingers of each pair of retention fingers are staggered in a lengthwise direction along the cavity.

9. The reclosable packaging case of claim 1 wherein the cavity comprises an elongate wiper blade body receiving channel defined by the cavity sidewalls and the cavity bottom, and wherein the cavity further comprises an elongate wiper blade wiping element receiving channel formed in the cavity bottom that is narrower than the elongate wiper blade receiving channel and which has a channel bottom spaced from an outer tip of a wiping element of a wiper blade received in the wiper blade receiving cavity.

10. The reclosable packaging case of claim 1 wherein the wiper blade receiving cavity has a width and a necked down wiper blade centering or locating section of reduced width disposed outwardly of the at least one retention finger.

11. The reclosable packaging case of claim 1 wherein there is a first generally opposed pair of retention fingers disposed on one side of an adapter of a wiper blade received in the cavity, and there is a second generally opposed pair of retention fingers disposed on the other side of the adapter of the wiper blade received in the cavity.

12. The reclosable packaging case of claim 11 wherein the wiper blade receiving cavity has one necked down section of reduced width on one side of an adapter of a wiper blade received in the cavity, and another necked down section of reduced width on the other side of the adapter of the wiper blade received in the cavity.

13. The reclosable packaging case of claim 12 wherein the cavity further comprises an adapter seat that is a recess formed in the wiper blade receiving cavity that receives an adapter of a wiper blade received in the cavity with one portion of the channel extending outwardly from the adapter seat in one direction and another portion of the channel extending outwardly from the adapter seat in an opposite direction.

14. The reclosable packaging case of claim 1 wherein the cover engages a top surface of a wiper blade received in the wiper blade cavity formed in the bottom panel when the top panel is disposed in the closed position helping to retain the wiper blade received in the cavity formed in the bottom panel.

15. A reclosable packaging case for a pre-curved beam type wiper blade in combination with a pre-curved beam type wiper blade comprising:
a pre-curved beam type wiper blade comprising:
an elongate wiper blade body comprised of an airfoil with a curved outer airfoil surface, and an elongate pre-curved beam carrying the airfoil; and
an elongate wiping element extending outwardly from the wiper blade body and having a wiping tip; and
a packaging case comprising:
a bottom panel having a wiper blade receiving cavity formed therein that is comprised of an elongate wiper blade body receiving channel defined by a pair of channel sidewalls and a bottom wall, an elongate wiping element receiving channel formed in the wiper blade body receiving channel bottom wall that comprises a wiping element receiving channel bottom spaced from the tip of the wiping element of the beam type wiper blade received in the wiper blade receiving cavity preventing contact between the wiping element receiving channel bottom and the tip, and at least one wiper blade retention finger extending into the wiper blade body receiving channel that has a blade retention surface facing toward the wiper blade body receiving channel bottom wall, the wiper blade retention surface being curved substantially complementarily to substantially conform to the curved outer airfoil surface when engaging the curved outer airfoil surface of the airfoil of the beam type wiper blade when the beam type wiper blade is received in the wiper blade receiving cavity such that the at least one wiper blade retention finger releasably retains the beam type wiper blade in the wiper blade receiving cavity;
a top panel configured to overlie the wiper blade receiving cavity when disposed in a closed position in engagement with the bottom panel; and
a hinge pivotally connecting the top and bottom panels.

16. The reclosable packaging case and beam type wiper blade combination of claim 15 wherein the curved outer airfoil surface of the airfoil of the beam type wiper blade is generally concavely curved, and the blade retention surface of the at least one retention finger is generally convexly curved.

17. The reclosable packaging case and beam type wiper blade combination of claim 15 wherein the packaging case has a pair of the retention fingers with one of the retention fingers extending from one of the wiper blade body receiving channel sidewalls into the wiper blade body receiving channel and the other one of the retention fingers extending from the other one of the wiper blade body receiving channel sidewalls into the wiper blade body receiving channel, and wherein the retention fingers are staggered in a lengthwise direction along the wiper blade body receiving channel.

18. The reclosable packaging case and beam type wiper blade combination of claim 15 wherein the beam type wiper blade further comprises an adapter, wherein the packaging case has a first pair of the retention fingers disposed on one side of the adapter of the beam type wiper blade received in the wiper blade receiving cavity that project generally in opposite directions, and a second pair of the retention fingers disposed on the other side of the adapter of the beam type wiper blade received in the wiper blade receiving cavity that project generally in opposite directions.

19. The reclosable packaging case and beam type wiper blade combination of claim 18 wherein the retention fingers of the first pair are staggered relative to one another, and the retention fingers of the second pair are staggered relative to one another.

20. The reclosable packaging case and beam type wiper blade combination of claim 15 wherein the bottom panel comprises a top wall in which the cavity is disposed with the at least one wiper blade retention finger extending outwardly from at or adjacent where each one of the wiper blade body receiving channel sidewalls meet the top wall.

21. The reclosable packaging case and beam type wiper blade combination of claim 15 wherein the at least one retention finger further comprises a generally planar wiper blade entry facilitating surface facing generally away from the wiper blade body receiving channel bottom wall, the wiper blade entry facilitating surface inclined into the wiper blade body receiving channel.

22. The reclosable packaging case and beam type wiper blade combination of claim 15 wherein the wiper blade body receiving channel has a width and a necked down wiper blade centering or locating section of reduced width disposed outwardly of the at least one retention finger.

23. The reclosable packaging case and beam type wiper blade combination of claim 15 wherein a portion of the wiper blade body receiving channel bottom wall alongside each side of the wiper blade wiping element receiving channel respectively comprises a first and second ledge, the second channel has a depth greater than a distance from the wiping tip of the wiping element received in the wiper blade wiping element receiving channel, the first and second ledges configured to support a portion of a flange on the airfoil of the beam type wiper blade that extends outwardly beyond either side of the wiping element of the beam type wiper blade.

24. The reclosable packaging case and beam type wiper blade combination of claim 15 wherein one of the top and bottom panels are configured to provide a reclosable packaging case closure arrangement formed of a plurality of elongate bar snaps extending about the periphery of the wiper blade receiving cavity with each one of the bar snaps comprised of an elongate boss formed in one of the top and bottom panels that is received in a corresponding elongate pocket formed in the other one of the top and bottom panels.

25. The reclosable packaging case and beam type wiper blade combination of claim 15 wherein the bottom panel further includes at least one recessed area generally transverse to the wiper blade body receiving channel and the wiper blade wiping element receiving channel that is wider than any portion of the wiper blade body receiving channel and has a bottom generally coplanar to the bottom of the wiper blade wiping element receiving channel.

26. The reclosable packaging case and beam type wiper blade combination of claim 15 wherein:
    the bottom panel includes a raised rib extending around at least a portion of the outer periphery of the bottom panel; and
    the top panel includes a channel extending around at least a portion of the outer periphery of the top panel and corresponding to the rib of the bottom panel, wherein the rib engages the channel to positively retain the top panel in a closed position over the bottom panel enabling the packaging case to be opened and reclosed.

27. The reclosable packaging case and beam type wiper blade combination of claim 15 wherein
    the beam type wiper blade comprises an adapter connected to a central portion of the wiper blade and configured to engage a wiper arm of a vehicle; and
    the bottom panel includes an adapter seat, the adapter seat formed of a recess in the bottom panel in communication with at least one of the wiper blade body receiving channel and the wiper blade wiping element receiving channel, and the adapter seat having a first and a second end wall disposed on longitudinally opposite sides of the recess, wherein the adapter seat is configured to receive the adapter of the beam type wiper blade when the beam type wiper blade is releasably received in the wiper blade receiving cavity.

28. The reclosable packaging case and beam type wiper blade combination of claim 27 wherein the top panel engages a top surface of the adapter of the beam type wiper blade received in the wiper blade cavity when the top panel is disposed in the closed position helping retain the beam type wiper blade in the wiper blade receiving cavity of the bottom panel.

29. A reclosable packaging case for a pre-curved beam type wiper blade in combination with a pre-curved beam type wiper blade comprising:
    (a) the pre-curved beam type wiper blade comprising:
        (1) a wiper blade mounting adapter;
        (2) an elongate wiper blade body carrying the adapter, the wiper blade body comprised of an elongate longitudinally extending airfoil having a concavely curved outer airfoil surface; and
        (3) an elongate longitudinally extending wiping element extending outwardly from the wiper blade body and having a wiping tip; and
    (b) the reclosable packaging case comprising:
        (1) a bottom panel having an elongate longitudinally extending wiper blade receiving cavity formed therein that is comprised of (i) a recessed adapter seat configured to receive the adapter of the beam type wiper blade, (ii) an elongate wiper blade receiving cavity defined by a pair of sidewalls and a bottom wall, and (iii) a plurality of pairs of wiper blade retention fingers extending into the wiper blade receiving cavity with one of the pairs of the wiper blade retention fingers disposed on one side of the adapter seat and another one of the pairs of the wiper blade retention fingers disposed on the other side of the adapter seat, each one of the wiper blade retention fingers having a blade retention surface generally facing toward the wiper blade receiving cavity bottom wall and being convexly curved substantially conforming to the concavely curved outer airfoil surface of the airfoil of the beam type wiper blade received in the wiper blade receiving cavity and bearing against the concavely curved outer airfoil surface of the airfoil of the beam type wiper blade received in the wiper blade receiving cavity releasably retaining the beam type wiper blade in the wiper blade receiving cavity;
        (2) a top panel configured to cover the wiper blade receiving cavity when disposed in a closed position in engagement with the bottom panel; and
        (3) an elongate longitudinally extending hinge interconnecting the top and bottom panels along a common elongate longitudinally extending side of the top and bottom panels.

30. The reclosable packaging case and beam type wiper blade combination of claim 29 wherein each one of the plurality of pairs of wiper blade retention fingers are staggered along the length of the wiper blade receiving cavity.

31. The reclosable packaging case and beam type wiper blade combination of claim 29 wherein each wiper blade retention finger further comprises a generally planar wiper blade entry facilitating surface facing generally away from the wiper blade receiving cavity bottom wall, the wiper blade entry facilitating surface inclined into the wiper blade receiving cavity.

32. The reclosable packaging case and beam type wiper blade combination of claim 29 wherein one of the top and bottom panels are configured to provide a reclosable packaging case closure arrangement formed of a plurality of elongate bar snaps extending about the periphery of the wiper blade receiving cavity with each one of the bar snaps comprised of an elongate boss formed in one of the top and bottom panels that is received in a corresponding elongate pocket formed in the other one of the top and bottom panels when the top panel is disposed in the closed position.

33. The reclosable packaging case and beam type wiper blade combination of claim 32 wherein the reclosable packaging case closure arrangement further comprises an elongate upraised rib formed in one of the top and bottom panels that extends along the hinge, and an elongate recessed channel formed in the other one of the top and bottom panels that extends along the hinge and which receives the rib when the top panel is disposed in the closed position.

* * * * *